US011400902B2

(12) United States Patent
Sato

(10) Patent No.: US 11,400,902 B2
(45) Date of Patent: Aug. 2, 2022

(54) VEHICLE

(71) Applicant: TOYOTA JIDOSHA KABUSHIKI KAISHA, Toyota (JP)

(72) Inventor: Shun Sato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 16/988,905

(22) Filed: Aug. 10, 2020

(65) Prior Publication Data

US 2021/0101572 A1 Apr. 8, 2021

(30) Foreign Application Priority Data

Oct. 8, 2019 (JP) .............................. JP2019-185163

(51) Int. Cl.
*B60T 8/1755* (2006.01)

(52) U.S. Cl.
CPC ...... *B60T 8/17551* (2013.01); *B60T 8/17554* (2013.01); *B60T 2260/08* (2013.01); *B60T 2260/09* (2013.01); *B60T 2270/613* (2013.01)

(58) Field of Classification Search
CPC ............ B60T 8/17551; B60T 8/17554; B60T 2260/08; B60T 2260/09; B60T 2270/613; B60T 2201/12; B60T 2230/04; B60T 8/17555; B60W 30/20; B60W 10/06; B60W 10/188
See application file for complete search history.

(56) References Cited

U.S. PATENT DOCUMENTS

| | | | | |
|---|---|---|---|---|
| 2003/0004635 A1* | 1/2003 | Kamiya | ............... | F02N 11/0837 477/203 |
| 2009/0259370 A1* | 10/2009 | Kaigawa | ............... | B60W 10/18 701/48 |
| 2012/0179332 A1* | 7/2012 | Harima | ............... | F02D 41/1498 701/37 |

FOREIGN PATENT DOCUMENTS

| | | |
|---|---|---|
| JP | H10-280990 A | 10/1998 |
| JP | 2004-137702 A | 5/2004 |
| JP | 2006-297994 A | 11/2006 |
| WO | 2006109139 A1 | 10/2006 |

OTHER PUBLICATIONS

U.S. Appl. No. 16/743,666, filed Jan. 15, 2020.

* cited by examiner

*Primary Examiner* — Marthe Y Marc-Coleman
(74) *Attorney, Agent, or Firm* — Oliff PLC

(57) ABSTRACT

In a vehicle, application of hydraulic pressure in a hydraulic braking device is started, when an accelerator is turned on, and the accelerator is predicted to be turned off, and engine braking feeling is predicted to become insufficient, the engine braking feeling being deceleration feeling given to a driver when the accelerator is turned off and an engine brake is operated, and a predetermined condition that prediction time until the accelerator is turned off is shorter than dead time of a hydraulic pressure response of the hydraulic braking device is established. The hydraulic braking device generates a negative jerk in the vehicle when the accelerator is turned off upon lapse of dead time after application of the hydraulic pressure in the hydraulic braking device is started.

7 Claims, 9 Drawing Sheets

VEHICLE

INCORPORATION BY REFERENCE

The disclosure of Japanese Patent Application No. 2019-185163 filed on Oct. 8, 2019 including the specification, drawings and abstract is incorporated herein by reference in its entirety.

BACKGROUND

1. Technical Field

The present disclosure relates to a vehicle.

2. Description of Related Art

As vehicles that output motive power from an engine to driving wheels with the speed of the motive power being changed with a transmission, there have been proposed vehicles that increase an operation amount of engine accessory devices, such as an alternator, and an air conditioner, increase a braking amount of a braking unit, such as a brake, or conduct downshift of the transmission, when fuel cut of the engine is prohibited at the time of engine deceleration (see, for example, Japanese Patent Application Publication No. 10-280990). In the vehicles, such control is performed to secure deceleration feeling when the fuel cut of the engine is prohibited.

There have also been proposed operating machines including an actuator that drives movable parts of the operating machines, a control lever for operating the actuator, and a controller that controls the actuator in response to an operation command of the control lever (see, for example, Japanese Patent Application Publication No. 2004-137702). In the operating machines, the controller calculates a target speed of the actuator in response to the operation amount of the control lever, and performs second-order differentiation of the calculated target speed so as to calculate a jerk prediction value. When the calculated jerk prediction value exceeds a prescribed value, the target speed is corrected such that the jerk prediction value becomes the prescribed value or below. Thus, the jerk, generated when sudden operation of the control lever is performed, is reduced.

SUMMARY

In a vehicle, when an accelerator is turned off and an engine brake is operated, an insufficient deceleration feeling may be given to a driver. In this case, it is considered that when an accelerator is turned off, a hydraulic braking device, capable of applying hydraulic braking force to the wheels including driving wheels, applies braking force to each of the wheels such that a negative jerk is generated in the vehicle. However, when an application speed of the hydraulic pressure in the hydraulic braking device is high, some elements (for example, pump etc.) of the hydraulic braking device may vibrate, resulting in vibration of the vehicle.

A primary object of a vehicle of the present disclosure is to give a sufficient deceleration feeling to a driver while restraining vibration generated in the vehicle, when an accelerator is turned off.

The vehicle of the present disclosure adopts following means in order to accomplish the aforementioned primary object.

The vehicle of the present disclosure includes: an engine, a hydraulic braking device, and a control unit. The engine is configured to output motive power to driving wheels. The hydraulic braking device is configured to apply hydraulic braking force to wheels including the driving wheels. The control unit is configured to control the engine and the hydraulic braking device. The control unit starts to apply hydraulic pressure in the hydraulic braking device, when an accelerator is turned on, and the control unit predicts that the accelerator will be turned off, and the control unit predicts that engine braking feeling will become insufficient, the engine braking feeling being deceleration feeling given to a driver when the accelerator is turned off and an engine brake is operated, and a predetermined condition is established, the predetermined condition being that prediction time until the accelerator is turned off is shorter than dead time of a hydraulic pressure response of the hydraulic braking device. The control unit causes the hydraulic braking device to generate a negative jerk in the vehicle, when the accelerator is turned off upon lapse of dead time after application of the hydraulic pressure in the hydraulic braking device is started.

In the vehicle of the present disclosure, application of the hydraulic pressure in the hydraulic braking device is started, when an accelerator is turned on, and the accelerator is predicted to be turned off, and engine braking feeling is predicted to become insufficient, the engine braking feeling being deceleration feeling given to a driver when the accelerator is turned off and the engine brake is operated, and a predetermined condition is established, the predetermined condition being that prediction time until the accelerator is turned off is shorter than dead time of a hydraulic pressure response of the hydraulic braking device. The hydraulic braking device generates a negative jerk in the vehicle, when the accelerator is turned off upon lapse of dead time after application of the hydraulic pressure in the hydraulic braking device is started. Here, the term "dead time" refers to the time until application of the braking force to each of the wheels is started after the start of application of the hydraulic pressure in the hydraulic braking device. The term "jerk" refers to a value obtained by differentiating a speed two times (differentiating an acceleration one time). When the prescribed condition is established, and the accelerator is turned off upon lapse of the dead time after the start of application of hydraulic pressure in the hydraulic braking device, the hydraulic braking device is made to generate a negative jerk in the vehicle, which makes it possible to give a driver a sufficient deceleration feeling when the accelerator is turned off. When the predetermined condition is established, application of the hydraulic pressure in the hydraulic braking device is started before the accelerator is turned off. As a result, the hydraulic pressure of the hydraulic braking device when the accelerator is turned off can be kept high within the range that the braking force is not applied to each of the wheels. Accordingly, as compared with the case where application of the hydraulic pressure in the hydraulic braking device is started after the accelerator is turned off, it is possible to restrain the application speed of the hydraulic pressure in the hydraulic braking device from increasing in order to generate a negative jerk, restrain generation of vibration in elements of the hydraulic braking devices (for example, pump etc.), and thereby restrain generation of vibration in the vehicle. As a result, it becomes possible to give a sufficient deceleration feeling to a driver when the accelerator is turned off, while restraining generation of vibration in the vehicle.

In the vehicle of the present disclosure, the dead time may be time taken for filling a driving cylinder of a brake pad of the hydraulic braking device with hydraulic fluid.

In the vehicle of the present disclosure, when the accelerator is turned off upon lapse of the dead time after the start of application of hydraulic pressure in the hydraulic braking device, the control unit causes the hydraulic braking device to generate the negative jerk in the vehicle, and when the engine brake starts to operate, the control unit ends application of the hydraulic pressure in the hydraulic braking device. With this configuration, a sufficient negative jerk of the vehicle is provided during a period until the engine brake starts to operate after the accelerator is turned off. As a result, a sufficient deceleration feeling can be given to the driver when the accelerator is turned off.

In the vehicle of the present disclosure, the control unit may predict that the accelerator will be turned off when an accelerator operation amount decrease rate that is a decrease amount per unit time of an accelerator operation amount becomes equal to or more than a threshold, the threshold decreasing as the accelerator operation amount decreases.

In the vehicle of the present disclosure, the control unit may predict that the engine braking feeling will become insufficient when at least one condition is established, out of a condition that a gear stage of a transmission provided between the engine and the driving wheels is equal to a prescribed gear stage or more, a condition that the vehicle travels on a downhill road, a condition that another vehicle is present within a first prescribed distance ahead of the vehicle, and a condition that a corner is present within a second prescribed distance ahead of the vehicle. This is based on the following reason. When the gear stage of the transmission is high, the speed of the engine is lower and the braking force of the vehicle provided by the engine brake is smaller than when the gear stage is low. When the vehicle travels on a downhill road, when another vehicle is present within a relatively short distance ahead of the vehicle, or when a corner is present within a relatively short distance ahead of the vehicle, it can be assumed that the driver desires a relatively large deceleration feeling.

In the vehicle of the present disclosure, even when predicting that the engine braking feeling will become insufficient, the control unit may not start application of the hydraulic pressure in the hydraulic braking device when at least one condition is established, out of a condition that an absolute value of a steering angle is larger than a prescribed steering angle, a condition that an absolute value of a lateral acceleration of the vehicle is larger than a prescribed acceleration, and a condition that a prescribed travel function is in operation.

In the vehicle of the present disclosure, the control unit may end application of the hydraulic pressure in the hydraulic braking device when the accelerator is turned on upon lapse of the dead time after start of application of the hydraulic pressure in the hydraulic braking device. With this configuration, application of the hydraulic pressure in the hydraulic braking device can be ended without application of the braking force to the vehicle. As a result, it is possible to restrain such inconvenience as unnecessary deceleration of the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Now, aspects of carrying out the present disclosure will be described based on embodiments.

Figure 1:
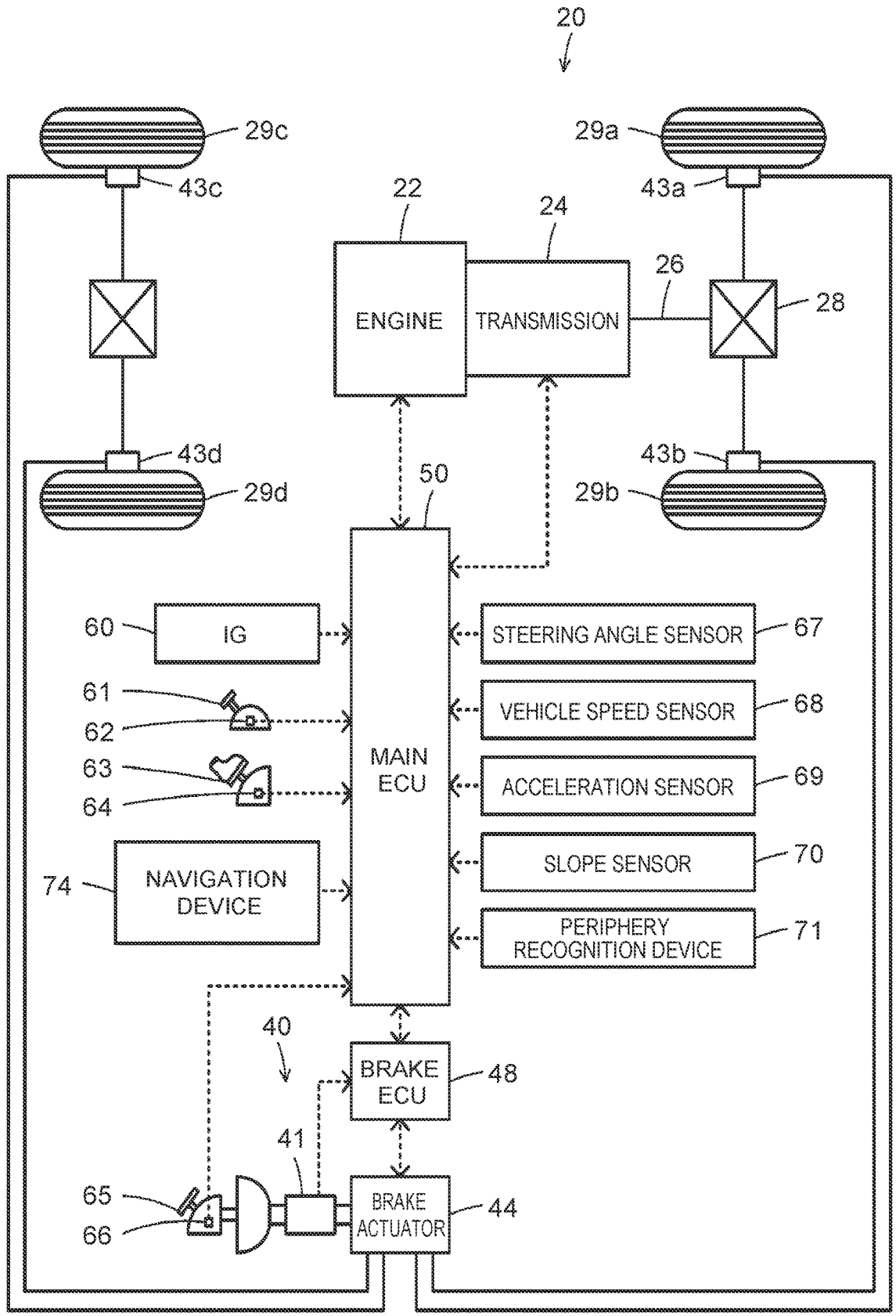
FIG. 1 is a block diagram showing an outlined configuration of a vehicle 20 as an embodiment of the present disclosure.
Figure 2:
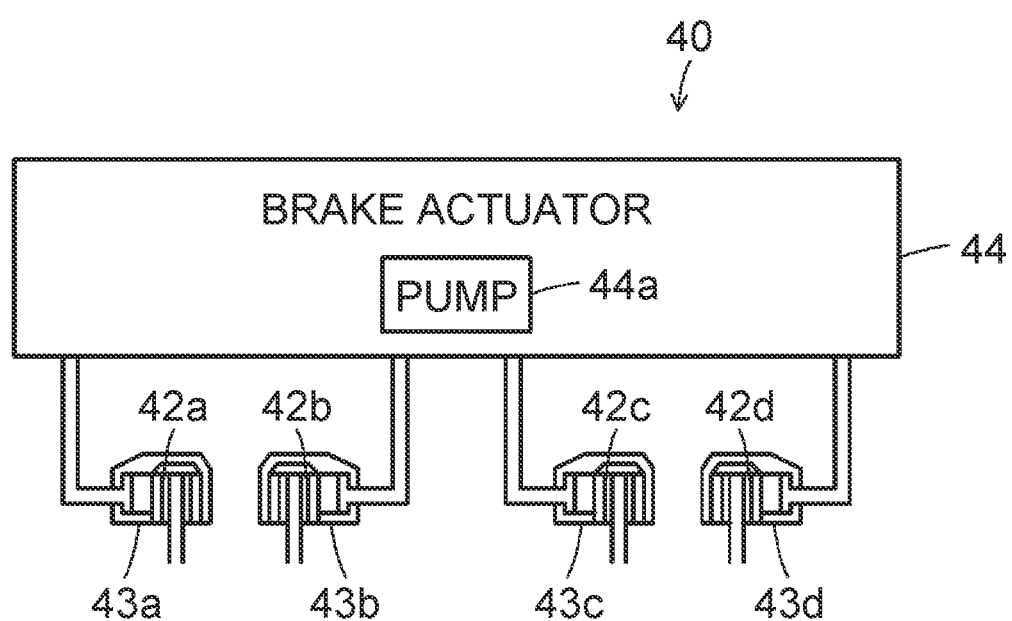
FIG. 2 is a block diagram showing an outlined configuration of a hydraulic braking device 40.

FIG. 1 is a block diagram showing an outlined configuration of a vehicle 20 as an embodiment of the present disclosure. FIG. 2 is a block diagram showing an outlined configuration of a hydraulic braking device 40. As shown in FIG. 1, the vehicle 20 of the embodiment includes an engine 22, a transmission 24, the hydraulic braking device 40, an electronic control unit 48 for braking (hereinafter, referred to as "brake ECU"), a navigation device 74, and a main electronic control unit (hereinafter, referred to as "main ECU") 50.

The engine 22 is configured as an internal combustion engine that outputs motive power by using fuel, such as gasoline, and gas oil. The transmission 24 is configured as a six-gear stepped transmission including an input shaft, an output shaft, a plurality of planetary gears, and a plurality of hydraulically-operated friction engagement elements (a clutch and a brake). The input shaft of the transmission 24 is connected to the engine 22, and the output shaft of the transmission 24 is connected to a driving shaft 26 that is coupled with driving wheels 29a, 29b through a differential gear 28. At the time of forward travel of the vehicle, the transmission 24 changes the speed of the motive power from the engine 22 in six stages, and outputs the motive power to the driving shaft 26.

As shown in FIGS. 1 and 2, the hydraulic braking device 40 includes a master cylinder 41, brake pads 42a to 42d attached to the driving wheels 29a, 29b and driven wheels 29c, 29d, brake wheel cylinders 43a to 43d that drive the brake pads 42a to 42d, and a brake actuator 44. The hydraulic braking device 40 basically supplies a master cylinder pressure Pmc, generated by the master cylinder 41 in response to a driver's foot force that acts on a brake pedal 65, to the brake wheel cylinders 43a to 43d through the brake actuator 44, and thereby drives the brake pads 42a to 42d such that braking force based on the master cylinder pressure Pmc is applied to the driving wheels 29a, 29b and the driven wheels 29c, 29d.

The brake actuator 44 is configured to regulate the master cylinder pressure Pmc generated by the master cylinder 41, and supplies the regulated pressure Pmc to the brake wheel cylinders 43a to 43d. The brake actuator 44 is also configured to be able to regulate the hydraulic pressure of the brake wheel cylinders 43a to 43d such that the braking force is applied to the driving wheels 29a, 29b and the driven wheels 29c, 29d irrespective of depression of the brake pedal 65 by a driver. The brake actuator 44 includes a pump 44a that is driven by an unillustrated motor to pump hydraulic fluid (brake oil), and a plurality of unillustrated valves.

Although not illustrated, the brake ECU 48 is configured as a microprocessor having a CPU as a main component. The brake ECU 48 includes a ROM that stores processing programs, a RAM that temporarily stores data, input and output ports, and a communication port, in addition to the CPU. As shown in FIG. 1, the brake ECU 48 receives, through the input port, signals input from various sensors that are necessary for drive control of the brake actuator 44. Examples of the signals input into the brake ECU 48 may include a master cylinder pressure (brake stepping force) from an unillustrated pressure sensor attached to the master cylinder 41, and wheel speeds Vwa to Vwd of the driving wheels 29a, 29b and the driven wheels 29c, 29d from unillustrated wheel speed sensors attached to the driving wheels 29a, 29b and the driven wheels 29c, 29d. The brake ECU 48 outputs signals, such as a control signal to the brake actuator 44, through the output port. The brake ECU 48 is connected with the main ECU 50 through the communication port.

The navigation device 74 includes a main body, a GPS antenna, and a display. Although the main body is not illustrated, the main body includes a CPU, a ROM, a RAM, a storage medium, input and output ports, and a communication port. The storage medium of the main body stores map information and the like. The map information is stored as a database including service information (such as sightseeing information, and parking area information) and traffic information on each travel section (such as sections between signaling devices and between junctions). The traffic information includes distance information, width information, number of lanes information, area information (urban areas and suburban areas), classification information (general roads and highways), slope information, legal speeds, and the number of signaling devices. The GPS antenna receives information relating to a current location of the vehicle. The display is configured as a touch panel display that displays various pieces of information including the information relating to the current location of the vehicle and a scheduled travel route to a destination, and also enables the user to input various instructions. The navigation device 74 is connected with the main ECU 50 through the communication port.

Although not illustrated, the main ECU 50 is configured as a microprocessor having a CPU as a main component. The main ECU 50 includes a ROM that stores processing programs, a RAM that temporarily stores data, input and output ports, and a communication port, in addition to the CPU. The main ECU 50 receives signals from various sensors through the input port. Examples of the signals input into the main ECU 50 may include signals from various sensors that detect the state of the engine 22, such as a crank angle $\theta cr$ from a crank position sensor that detects the rotational position of a crankshaft of the engine 22. Examples of the signals also include a speed Nin of the input shaft of the transmission 24 from a speed sensor attached to the input shaft, and a speed Nout of an output shaft of the transmission 24 from a speed sensor attached to the output shaft. Examples of the signals may also include an ignition signal from an ignition switch 60, and a shift position SP from a shift position sensor 62 that detects an operative position of a shift lever 61, an accelerator operation amount Acc from an accelerator pedal position sensor 64 that detects a depression amount of an accelerator pedal 63, and a brake pedal position BP from a brake pedal position sensor 66 that detects a depression amount of the brake pedal 65. Examples of the signals may also include a steering angle $\theta w$ from a steering angle sensor 67, a vehicle speed V from a vehicle speed sensor 68, and a longitudinal acceleration Gx that is an acceleration in a longitudinal direction of the vehicle and a lateral acceleration Gy that is an acceleration in a lateral direction of the vehicle from the acceleration sensor 69. Examples of the signals may also include a road surface gradient $\theta rd$ from a slope sensor 70, and information from a periphery recognition device 71 that recognizes the periphery of the vehicle. The periphery recognition device 71 is configured from a camera, a millimeter-wave radar, a sub-millimeter wave radar, an infrared ray laser radar, sonar, or the like. Examples of the information from the periphery recognition device 71 may include an inter-vehicle distance D from a preceding vehicle, and a road geometry ahead of the vehicle (such as a straight road and a corner).

The main ECU 50 outputs various control signals through the output port. Examples of the signals output from the main ECU 50 may include control signals to the engine 22 and the transmission 24. The main ECU 50 calculates a speed Ne of the engine 22 based on the crank angle $\theta cr$ from the crank position sensor. As described before, the main ECU 50 is connected with the brake ECU 48 and the navigation device 74 through the communication port.

In the thus-configured vehicle 20 of the embodiment, the main ECU 50 basically performs following travel control. The main ECU 50 sets a target gear stage Gs* of the transmission 24 based on the accelerator operation amount Acc and the vehicle speed V, and controls the transmission 24 such that the gear stage Gs of the transmission 24 coincides with a target gear stage Gs*. The main ECU 50 also sets a target torque Te* of the engine 22 based on the accelerator operation amount Acc, the vehicle speed V, and the gear stage Gs of the transmission 24, and controls the engine 22 such that the engine 22 is operated based on the target torque Te*.

Figure 3:
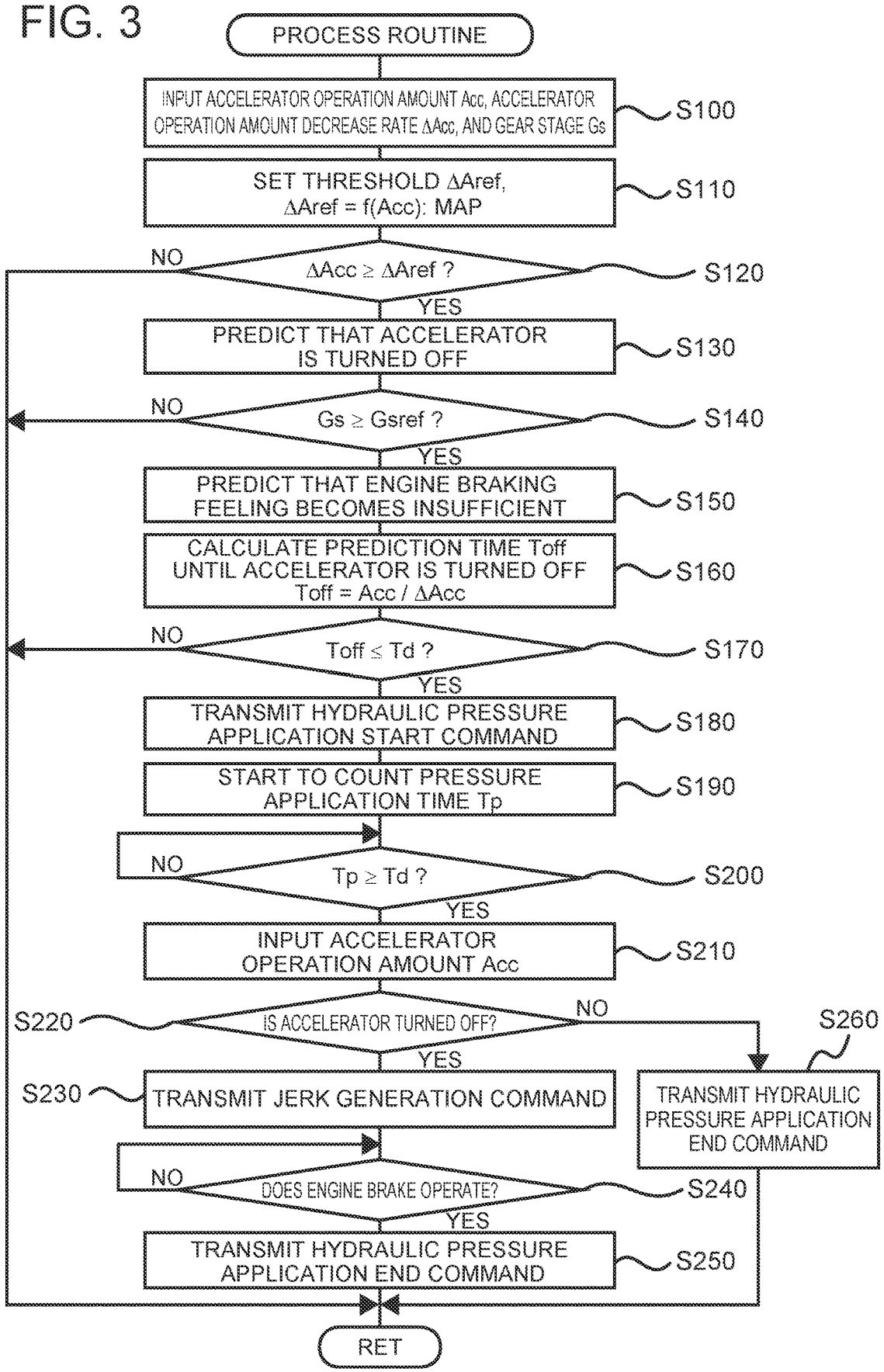
FIG. 3 is a flowchart showing an example of a process routine executed by a main ECU 50.

Description is now given of the operation of the thus-configured vehicle 20 of the embodiment, and more particularly, the operation at the time when the driver switches the state of the acceleration from a turned-on state to a turned-off state. FIG. 3 is a flowchart showing an example of a process routine executed by the main ECU 50. The routine is repeatedly executed while the accelerator is in the turned-on state. When the accelerator is turned off, the main ECU 50 performs fuel cut of the engine 22. This triggers operation of the engine brake. However, some time (about hundreds of msec) is needed until the engine brake operates after the accelerator is turned off.

When the process routine of FIG. 3 is executed, the main ECU 50 first inputs data relating to an accelerator operation amount Acc, an accelerator operation amount decrease rate $\Delta Acc$, a gear stage Gs of the transmission 24, and the like (step S100). Here, the accelerator operation amount Acc to be input is a value detected by the accelerator pedal position sensor 64. The accelerator operation amount decrease rate ΔAcc to be input is a value calculated as a decrease amount per unit time of the accelerator operation amount Acc (decrease-side values being positive). The gear stage Gs of the transmission 24 to be input is a gear stage corresponding to an engaged element, among a plurality of friction engagement elements.

Figure 4:
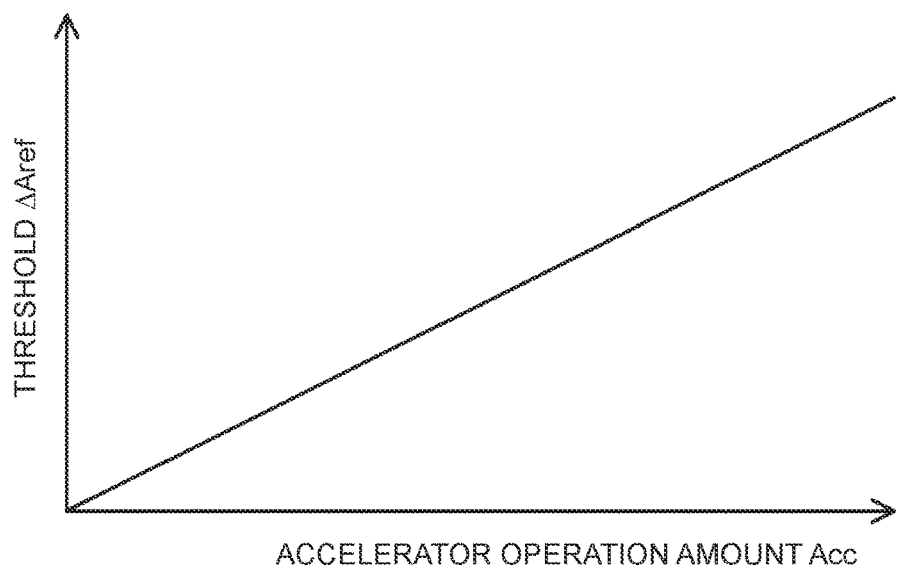
FIG. 4 is an explanatory view showing an example of a threshold setting map.

When data is obtained in this way, the main ECU 50 sets a threshold ΔAref using the accelerator operation amount Acc and a threshold setting map (step S110), and compares the accelerator operation amount decrease rate ΔAcc with the threshold ΔAref (step S120). Here, the threshold ΔAref is a threshold used for predicting whether the accelerator will be turned off or not. The threshold setting map is predetermined as a relationship between the accelerator operation amount Acc and the threshold ΔAref, and is stored in an unillustrated ROM. FIG. 4 is an explanatory view showing an example of the threshold setting map. As shown in the drawing, the threshold ΔAref is set to become smaller, as the accelerator operation amount Acc is smaller. This is based on the assumption that the possibility of the accelerator being turned off is higher as the accelerator operation amount Acc is smaller, even with the accelerator operation amount decrease rate ΔAcc being low. When the accelerator operation amount decrease rate ΔAcc is less than the threshold ΔAref, the main ECU 50 predicts that the accelerator will not be turned off, and ends the present routine.

In step S120, when the accelerator operation amount decrease rate ΔAcc is equal to the threshold ΔAref or more, the main ECU 50 predicts that the accelerator will be turned off (step S130), and compares the gear stage Gs of the transmission 24 with the threshold Gsref (step S140). Here, the threshold Gsref is a threshold used for predicting whether engine braking feeling that is deceleration feeling, given to the driver when the accelerator is turned off and the engine brake is operated, will become insufficient or not. When the gear stage Gs of the transmission 24 is high, the speed Ne of the engine 22 is lower and the braking force provided by the engine brake is smaller than when the gear stage Gs is low, and therefore the engine braking feeling tends to be insufficient. The process of step S140 is performed in consideration of this tendency. When the gear stage Gs of the transmission 24 is less than the threshold Gsref, the main ECU 50 predicts that the engine braking feeling will be sufficient, and ends the present routine.

When the gear stage Gs of the transmission 24 is equal to the threshold Gsref or more in step S140, the main ECU 50 predicts that engine braking feeling will become insufficient (step S150). Next, the main ECU 50 divides the accelerator operation amount Acc by the accelerator operation amount decrease rate ΔAcc to calculate prediction time Toff until the accelerator is turned off (step S160). The main ECU 50 compares the calculated prediction time Toff with dead time Td of a hydraulic pressure response of the hydraulic braking device 40 (step S170). Here, the dead time Td of the hydraulic pressure response of the hydraulic braking device 40 is the time taken to fill the brake wheel cylinders 43a to 43d with hydraulic fluid, i.e., the time until the brake pads 42a to 42d start to apply the breaking force to the driving wheels 29a, 29b and the driven wheels 29c, 29d after application of the hydraulic pressure to the brake wheel cylinders 43a to 43d is started. As the dead time Td, the time determined in advance by experiments or analysis based on the specifications of the hydraulic braking device 40 is used. The present routine is ended, when the prediction time Toff until the accelerator is turned off is longer than the dead time Td of the hydraulic pressure response of the hydraulic braking device 40.

In step S170, when the prediction time Toff until the accelerator is turned off is equal to the dead time Td of the hydraulic pressure response of the hydraulic braking device 40 or less, the main ECU 50 transmits a hydraulic pressure application command to the brake ECU 48 (step S180), and also starts to count pressure application time Tp (step S190). Upon reception of the hydraulic pressure application command, the brake ECU 48 starts application of the hydraulic pressure to the brake wheel cylinders 43a to 43d of the hydraulic braking device 40. As a result, hydraulic fluid is supplied to the brake wheel cylinders 43a to 43d.

Then, the main ECU 50 waits until the pressure application time Tp reaches the dead time Td of the hydraulic pressure response of the hydraulic braking device 40 or more (step S200). Accordingly, the hydraulic pressure of the brake wheel cylinders 43a to 43d of the hydraulic braking device 40 can be kept high within the range where the hydraulic braking device 40 does not apply braking force to the vehicle (where the brake pads 42a to 42d do not apply the braking force to the driving wheels 29a, 29b and the driven wheels 29c, 29d to be specific).

In step S200, when the pressure application time Tp reaches the dead time Td of the hydraulic pressure response of the hydraulic braking device 40 or more, the main ECU 50 inputs the accelerator operation amount Acc (step S210), and determines whether the accelerator is turned on or turned off based on the input accelerator operation amount Acc (step S220). When the accelerator is turned off, the main ECU 50 transmits a jerk generation command to the brake ECU 48 (step S230). Upon reception of the jerk generation command, the brake ECU 48 causes the hydraulic braking device 40 to generate a negative jerk in the vehicle. More specifically, the hydraulic braking device 40 is controlled such that the brake pads 42a to 42d are driven by the hydraulic pressure supplied to the brake wheel cylinders 43a to 43d of the hydraulic braking device 40, and the braking force is thereby applied to the driving wheels 29a, 29b and the driven wheels 29c, 29d. Jerk is a value obtained by differentiating the speed two times (differentiating the acceleration one time).

The main ECU 50 waits for the engine brake to operate (step S240), then transmits a hydraulic pressure application end command to the brake ECU 48 (step S250), and ends the present routine. Upon reception of the hydraulic pressure application end command, the brake ECU 48 ends application of the hydraulic pressure to the brake wheel cylinders 43a to 43d of the hydraulic braking device 40. This ends application of the braking force to the vehicle by the hydraulic braking device 40.

Thus, when the engine braking feeling is predicted to become insufficient, and then the accelerator is turned off, the hydraulic braking device 40 applies braking force to the vehicle so as to generate a negative jerk in the vehicle until the engine brake operates. This makes it possible to give a sufficient deceleration feeling to the driver.

When the engine braking feeling is predicted to become insufficient, application of the hydraulic pressure to the brake wheel cylinders 43a to 43d of the hydraulic braking device 40 is started before the accelerator is turned off. Accordingly, the hydraulic pressure of the brake wheel cylinders 43a to 43d when the accelerator is turned off can be made high within the range where the hydraulic braking device 40 does not apply braking force to the vehicle. Hence, as compared with the case where the hydraulic pressure is applied to the brake wheel cylinders 43a to 43d after the accelerator is turned off, it is possible to restrain the application speed of the hydraulic pressure to the brake wheel cylinders 43a to 43d from being increased in order to generate a negative jerk in the vehicle, restrain generation of vibration in the hydraulic braking device 40 (for example, a pump 44a of the brake actuator 44), and thereby restrain generation of vibration in the vehicle.

In step S220, when the accelerator is turned on, the main ECU 50 immediately transmits a hydraulic pressure application end command to the brake ECU 48 (step S260), and ends the present routine. In this case, when the dead time Td lapses after application of the hydraulic pressure to the brake wheel cylinders 43a to 43d of the hydraulic braking device 40 is started, the application of the hydraulic pressure is ended. Accordingly, the application of the hydraulic pressure to the brake wheel cylinders 43a to 43d can be ended, without the hydraulic braking device 40 applying the braking force to the vehicle. As a result, it is possible to restrain such inconvenience as unnecessary deceleration of the vehicle.

Figure 5:
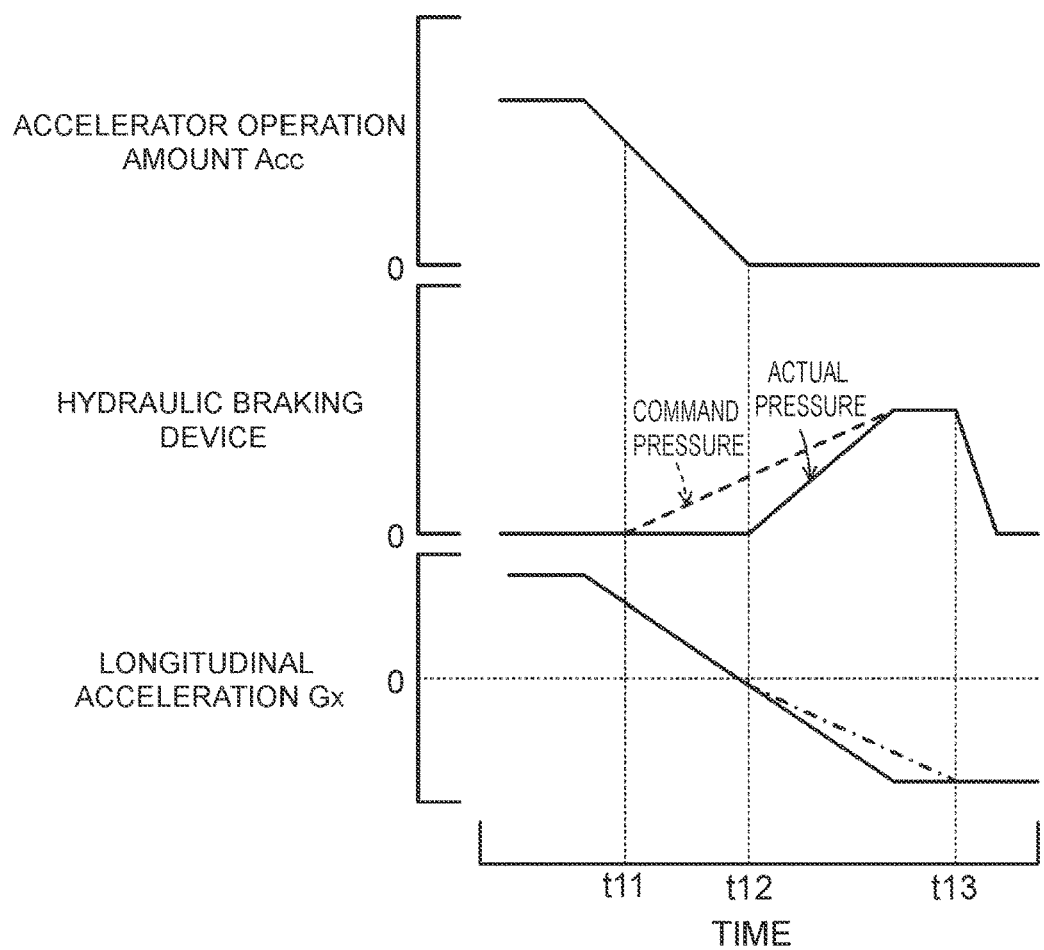
FIG. 5 is an explanatory view showing an example of the situation when an accelerator operation amount Acc lowers and an accelerator is turned off.

FIG. 5 is an explanatory view showing an example of the situation when the accelerator operation amount Acc lowers and the accelerator is turned off. In the drawing, as for the longitudinal acceleration Gx, a solid line represents the condition of the embodiment, and a chain line represents the condition of a comparative example. As the comparative example, the case where the hydraulic braking device 40 does not generate a negative jerk in the vehicle is considered.

As shown in the drawing, when the accelerator is turned on, when the accelerator is predicted to be turned off, when the engine braking feeling is predicted to become insufficient, and when the prediction time Toff until the accelerator is turned off is shorter than the dead time Td of the hydraulic pressure response of the hydraulic braking device 40 (time t11), application of the hydraulic pressure to the brake wheel cylinders 43a to 43d of the hydraulic braking device 40 is started (see "command pressure" of the hydraulic braking device in the drawing). When the accelerator is turned off upon lapse of the dead time Td after the start of application of the hydraulic pressure to the brake wheel cylinders 43a to 43d (time t12), the brake pads 42a to 42d are driven with the hydraulic pressure (see "real hydraulic pressure" of the hydraulic braking device in the drawing) of the brake wheel cylinders 43a to 43d of the hydraulic braking device 40, and thereby the braking force is applied to the driving wheels 29a, 29b and the driven wheels 29c, 29d. This makes it possible to generate a negative jerk in the vehicle and to provide a larger negative-side longitudinal acceleration Gx. As a result, a sufficient deceleration feeling can be given to the driver. In addition, application of the hydraulic pressure to the brake wheel cylinders 43a to 43d is started before the accelerator is turned off. Hence, as compared with the case where the hydraulic pressure is applied to the brake wheel cylinders 43a to 43d after the accelerator is turned off, it is possible to restrain the application speed of hydraulic pressure to the brake wheel cylinders 43a to 43d from being increased in order to generate a negative jerk in the vehicle, restrain generation of vibration in the hydraulic braking device 40 (for example, the pump 44a of the brake actuator 44), and thereby restrain generation of vibration in the vehicle. Then, when the fuel cut of the engine 22 is performed, and the engine brake starts to operate (time t13), application of the hydraulic pressure to the brake wheel cylinders 43a to 43d of the hydraulic braking device 40 is ended.

Figure 6:
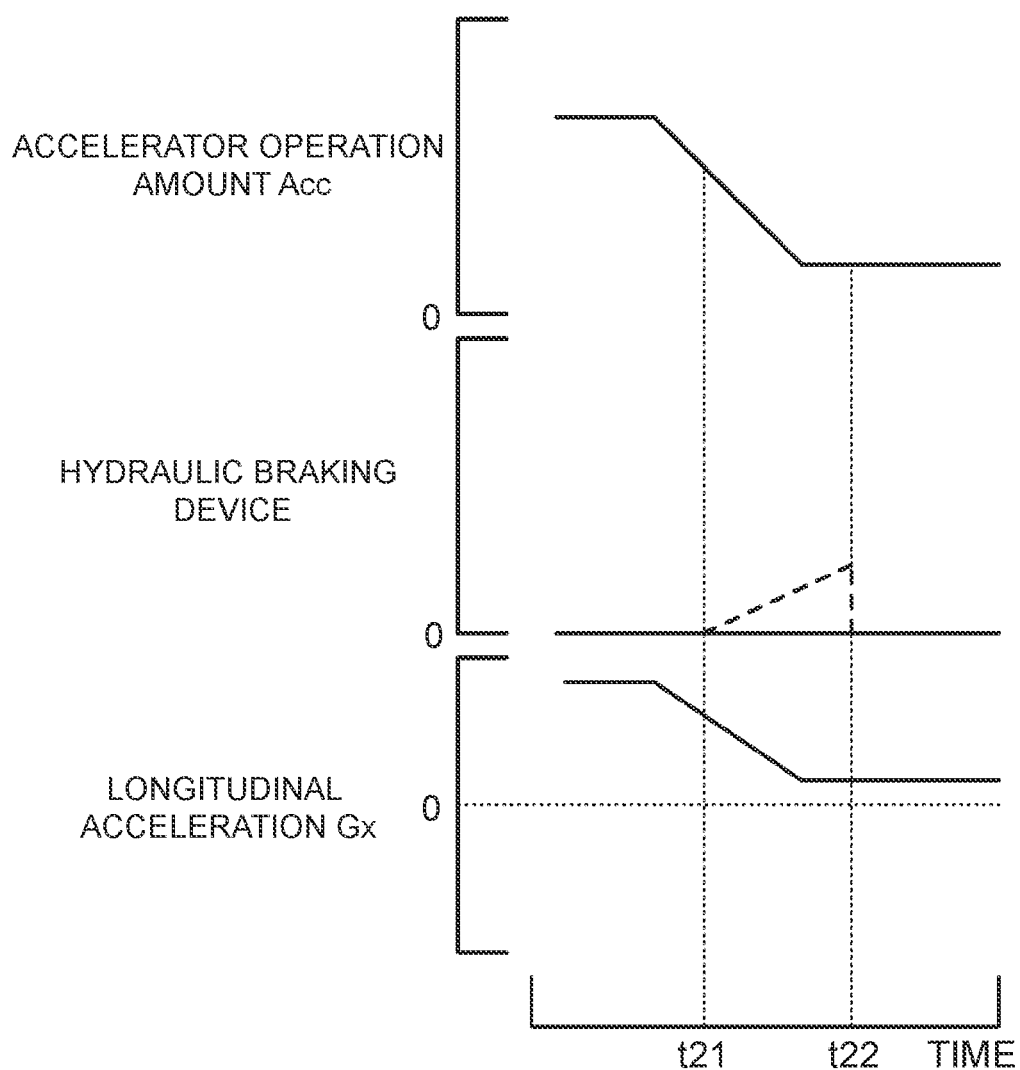
FIG. 6 is an explanatory view showing an example of the situation where the accelerator operation amount Acc lowers but the accelerator is not turned off.

FIG. 6 is an explanatory view showing an example of the situation where the accelerator operation amount Acc lowers but the accelerator is not turned off. As in FIG. 5, when the accelerator is turned on, when the accelerator is predicted to be turned off, when the engine braking feeling is predicted to become insufficient, and when the prediction time Toff until the accelerator is turned off is shorter than the dead time Td of the hydraulic pressure response of the hydraulic braking device 40 (time t21), application of the hydraulic pressure to the brake wheel cylinders 43a to 43d of the hydraulic braking device 40 is started. When the accelerator is turned on upon lapse of the dead time Td after the start of application of the hydraulic pressure to the brake wheel cylinders 43a to 43d (time t22), application of the hydraulic pressure to the brake wheel cylinders 43a to 43d of the hydraulic braking device 40 is immediately ended. As a result, application of the hydraulic pressure to the brake wheel cylinders 43a to 43d can be ended, without the hydraulic braking device 40 applying the braking force to the vehicle.

In the vehicle 20 of the embodiment described in the foregoing, when the accelerator is turned on, when the accelerator is predicted to be turned off, when the engine braking feeling is predicted to become insufficient, and when the prediction time Toff until the accelerator is turned off is shorter than the dead time Td of the hydraulic pressure response of the hydraulic braking device 40, application of the hydraulic pressure to the brake wheel cylinders 43a to 43d of the hydraulic braking device 40 is started. When the accelerator is turned off upon lapse of the dead time Td after the start of the application of the hydraulic pressure to the brake wheel cylinders 43a to 43d, the hydraulic braking device 40 is controlled such that the hydraulic braking device 40 generates a negative jerk in the vehicle. When the hydraulic braking device 40 generates a negative jerk in the vehicle when the accelerator is turned off, a sufficient deceleration feeling can be given to the driver. When the engine braking feeling is predicted to become insufficient, application of the hydraulic pressure to the brake wheel cylinders 43a to 43d is started before the accelerator is turned off. Hence, as compared with the case where the hydraulic pressure is applied to the brake wheel cylinders 43a to 43d after the accelerator is turned off, it is possible to restrain the application speed of hydraulic pressure to the brake wheel cylinders 43a to 43d from being increased in order to generate a negative jerk in the vehicle, restrain generation of vibration in the hydraulic braking device 40 (for example, the pump 44a of the brake actuator 44), and thereby restrain generation of vibration in the vehicle.

In the vehicle 20 of the embodiment, when the accelerator is turned off after the engine braking feeling is predicted to become insufficient, the main ECU 50 is configured to cause the hydraulic braking device 40 to apply braking force to the vehicle and thereby generate a negative jerk in the vehicle until the engine brake operates. However, the main ECU 50 may be configured to cause the hydraulic braking device 40 to apply braking force to the vehicle, when the engine braking feeling is predicted to become insufficient even after the engine brake operates.

Figure 7:
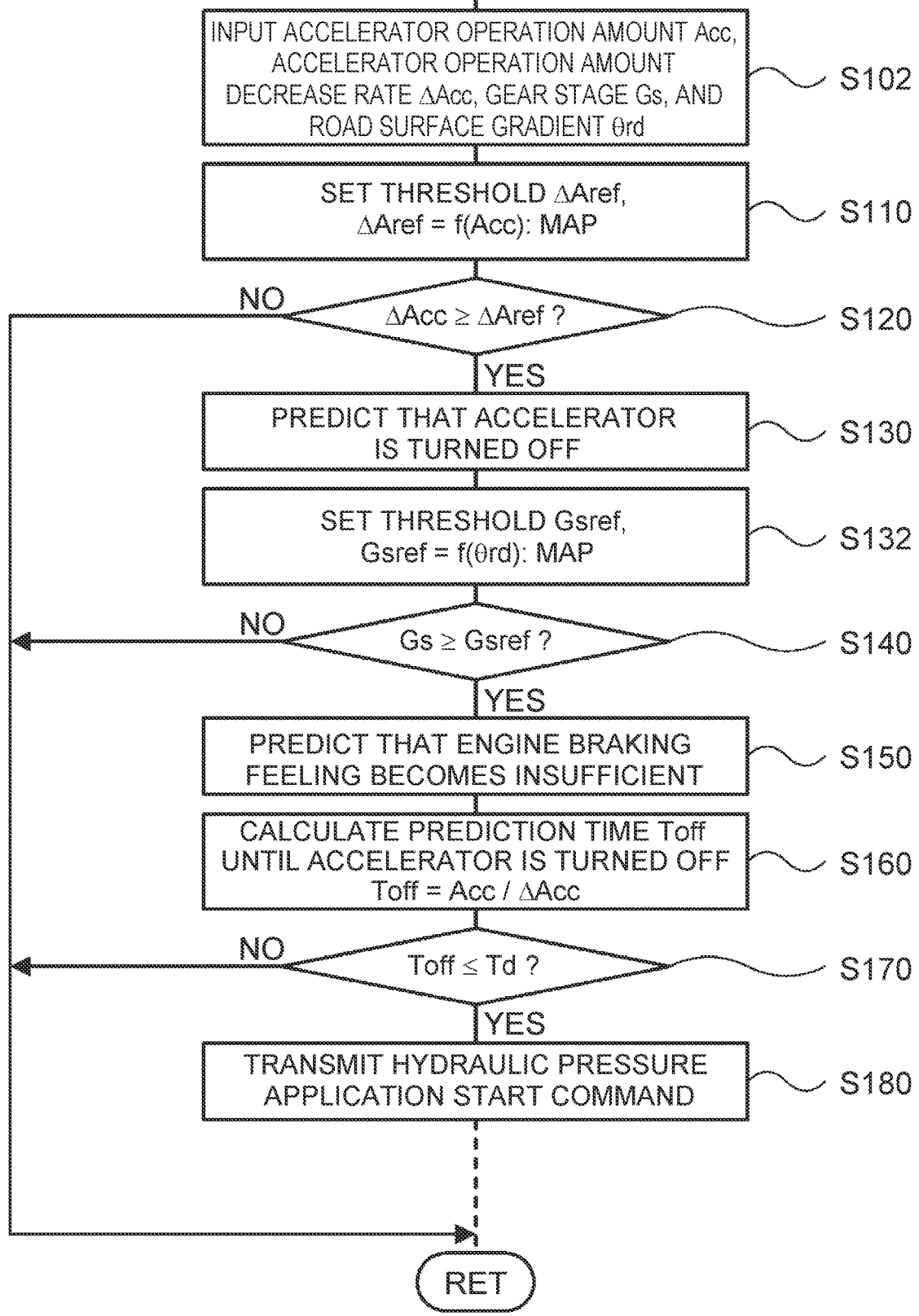
FIG. 7 is a flowchart showing an example of the process routine in a modification.

In the vehicle 20 of the embodiment, the main ECU 50 executes the process routine of FIG. 3. However, the main ECU 50 may execute a process routine of FIG. 7 instead. The process routine of FIG. 7 is the same as that of the process routine of FIG. 3 except for the point that the process of step S100 is replaced with the process of step S102 and the point that the process of step S132 is added. Therefore, illustration of the process of steps S190 to S260 in the process routine of FIG. 7 is omitted.

In the process routine of FIG. 7, the main ECU 50 first inputs the accelerator operation amount Acc, the accelerator operation amount decrease rate ΔAcc, and the gear stage Gs of the transmission 24 as in the process of step S100 in the process routine of FIG. 3, and additionally inputs a road surface gradient θrd, and the like (step S102). Here, the road surface gradient θrd to be input is a value detected by the slope sensor 70.

When predicting that the accelerator will be turned off in step S130, the main ECU 50 sets the threshold Gsref using the road surface gradient θrd and a second threshold setting map (step S132), and compares the gear stage Gs of the transmission 24 with the threshold Gsref (step S140). When the gear stage Gs of the transmission 24 is less than the threshold Gsref, the main ECU 50 predicts that the engine braking feeling will be sufficient, and ends the present routine. Meanwhile, when the gear stage Gs of the transmission 24 is equal to the threshold Gsref or more, the main ECU 50 predicts that the engine braking feeling will be insufficient (step S150), and executes the process subsequent to step S160.

Figure 8:
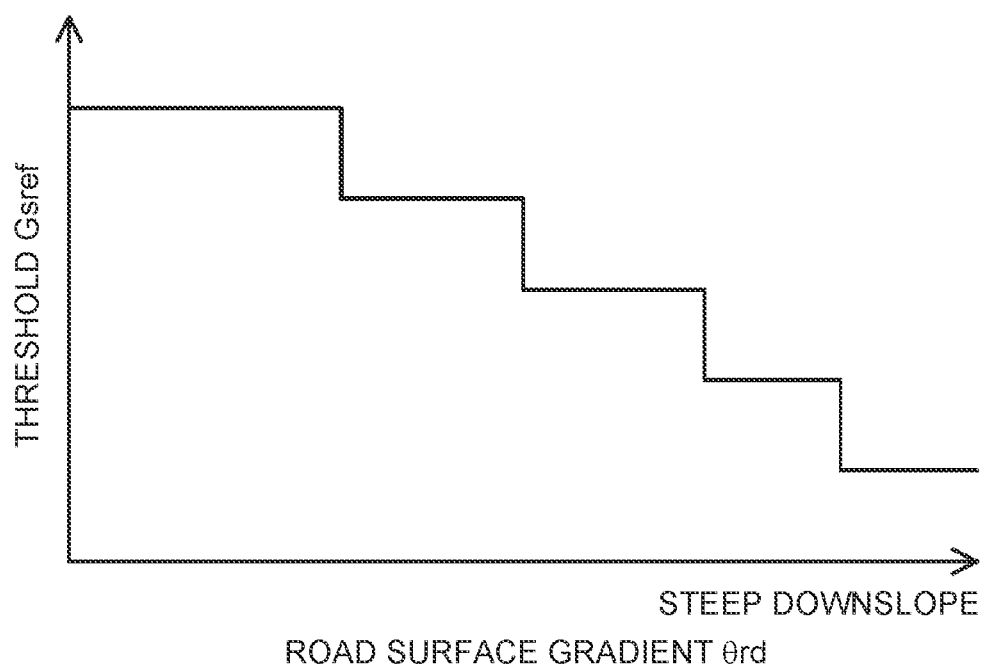
FIG. 8 is an explanatory view showing an example of a second threshold setting map.

Here, the second threshold setting map is predetermined as a relationship between the road surface gradient θrd and the threshold Gsref, and is stored in an unillustrated ROM. FIG. 8 is an explanatory view showing an example of the second threshold setting map. As shown in the drawing, the threshold Gsref is set to be smaller, as the road surface gradient θrd as a value of a downhill road side is larger. This is based on the assumption that as the road surface gradient θrd is larger as a value of the downhill road side, the vehicle tends to be accelerated, and therefore the engine braking feeling tends to be insufficient even with the gear stage of the transmission 24 being on the low speed stage side. With such setting of the threshold Gsref, it is possible to appropriately predict whether or not the engine braking feeling will become insufficient, i.e., appropriately determine whether or not to cause the hydraulic braking device 40 to generate a negative jerk in the vehicle when the accelerator is turned off.

Figure 9:
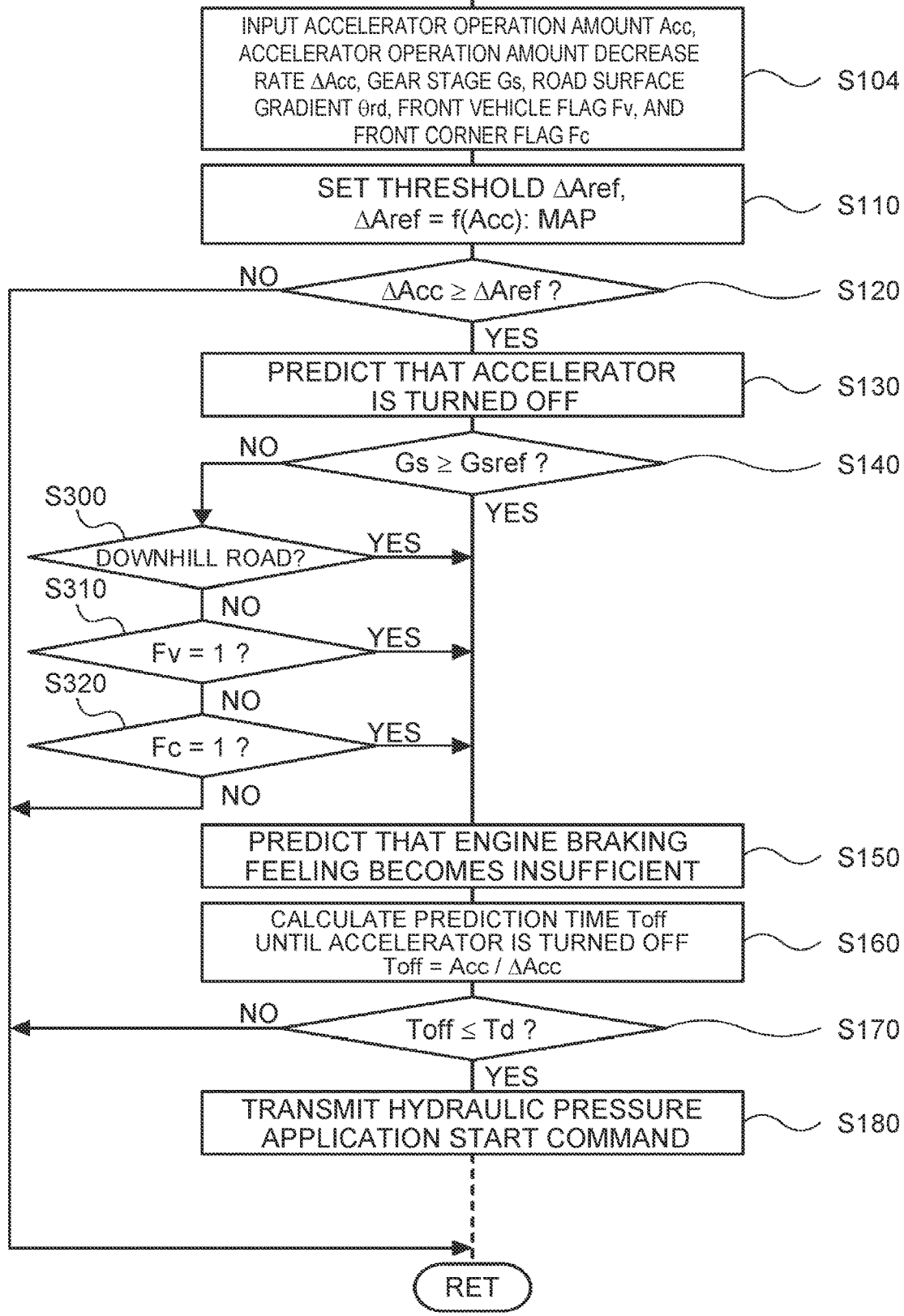
FIG. 9 is a flowchart showing an example of the process routine in a modification.

In the vehicle 20 of the embodiment, the main ECU 50 executes the process routine of FIG. 3. However, a process routine of FIG. 9 may be executed instead. The process routine of FIG. 9 is the same as that of the process routine of FIG. 3 except for the point that the process of step S100 is replaced with the process of step S104 and the point that the process of steps S300 to S320 is added. Therefore, illustration of the process of steps S190 to S260 in the process routine of FIG. 9 is omitted.

In the process routine of FIG. 9, the main ECU 50 first inputs the accelerator operation amount Acc, the accelerator operation amount decrease rate ΔAcc, and the gear stage Gs of the transmission 24 as in the process of step S100 in the process routine of FIG. 3, and additionally inputs a road surface gradient θrd, a front vehicle flag Fv, a front corner flag Fc, and the like (step S104).

Here, the road surface gradient θrd to be input is a value detected by the slope sensor 70. The front vehicle flag Fv to be input is a value set by a front vehicle flag setting routine which is not illustrated. In the front vehicle flag setting routine, when another vehicle is present within a prescribed distance L1 ahead of the vehicle based on the information from the periphery recognition device 71, the front vehicle flag Fv is set to a value one. When another vehicle is not present within the prescribed distance L1 ahead of the vehicle, the front vehicle flag Fv is set to a value zero. The front corner flag Fc to be input is a value set by a front corner flag setting routine which is not illustrated. In the front corner flag setting routine, when a corner is present within a prescribed distance L2 ahead of the vehicle based on the information from the navigation device 74 or based on the information from the periphery recognition device 71, the front corner flag Fc is set to a value one. When no corner is present within the prescribed distance L2 ahead of the vehicle, the front corner flag Fc is set to a value zero.

When the gear stage Gs of the transmission 24 is less than the threshold Gsref in step S140, the main ECU 50 determines whether or not the vehicle is traveling on a downhill road based on the road surface gradient θrd (step S300), checks the value of the front vehicle flag Fv (step S310), and checks the value of the front corner flag Fc (step S320). The process of steps S300 to S320, like the process of step S140, is also the process of predicting whether or not the engine braking feeling will become insufficient. When the vehicle is traveling on the downhill road, when another vehicle is present within a relatively short distance ahead of the vehicle, or when a corner is present within a relatively short distance ahead of the vehicle, it can be assumed that the driver desires a relatively large deceleration feeling, and the engine braking feeling tends to be insufficient. The process of steps S300 to S320 is performed in consideration of this tendency.

When the vehicle is not traveling on the downhill road (traveling on a flat road or an uphill road) in step S300, when the front vehicle flag Fv is set to the value zero in step S310, i.e., another vehicle is not present within the prescribed distance L1 ahead of the vehicle, and when the front corner flag Fc is set to the value zero in step S320, i.e., no corner is present within the prescribed distance L2 ahead of the vehicle, the main ECU 50 predicts that the engine braking feeling will be sufficient, and ends the present routine.

When the vehicle is traveling on the downhill road in step S300, or when the front vehicle flag Fv is set to the value one in step S310, i.e., when another vehicle is present within the prescribed distance L1 ahead of the vehicle, or when the front corner flag Fc is set to the value one in step S320, i.e., when a corner is present within the prescribed distance L2 ahead of the vehicle, the main ECU 50 predicts that the engine braking feeling will become insufficient (step S150), and executes the process subsequent to step S160. Accordingly, when the gear stage Gs of the transmission 24 is less than the threshold Gsref, but the vehicle is traveling on the downhill road, another vehicle is present within the prescribed distance L1 ahead of the vehicle, or a corner is present within the prescribed distance L2 ahead of the vehicle, the same effect as in the embodiment can be demonstrated.

In the modification, whether or not the engine braking feeling will become insufficient is predicted using the condition that the gear stage Gs of the transmission 24 is equal to the threshold Gsref or more, the condition that the vehicle is traveling on the downhill road, the condition that the front vehicle flag Fv is equal to the value one, and the condition that the front corner flag Fc is equal to the value one. However, whether the engine braking feeling will become insufficient is predicted using some of these four conditions.

In the modification, the process of steps S300 to S320 is added to the process routine of FIG. 3. However, the process of steps S300 to S320 may be added to the process routine of FIG. 7.

Figure 10:
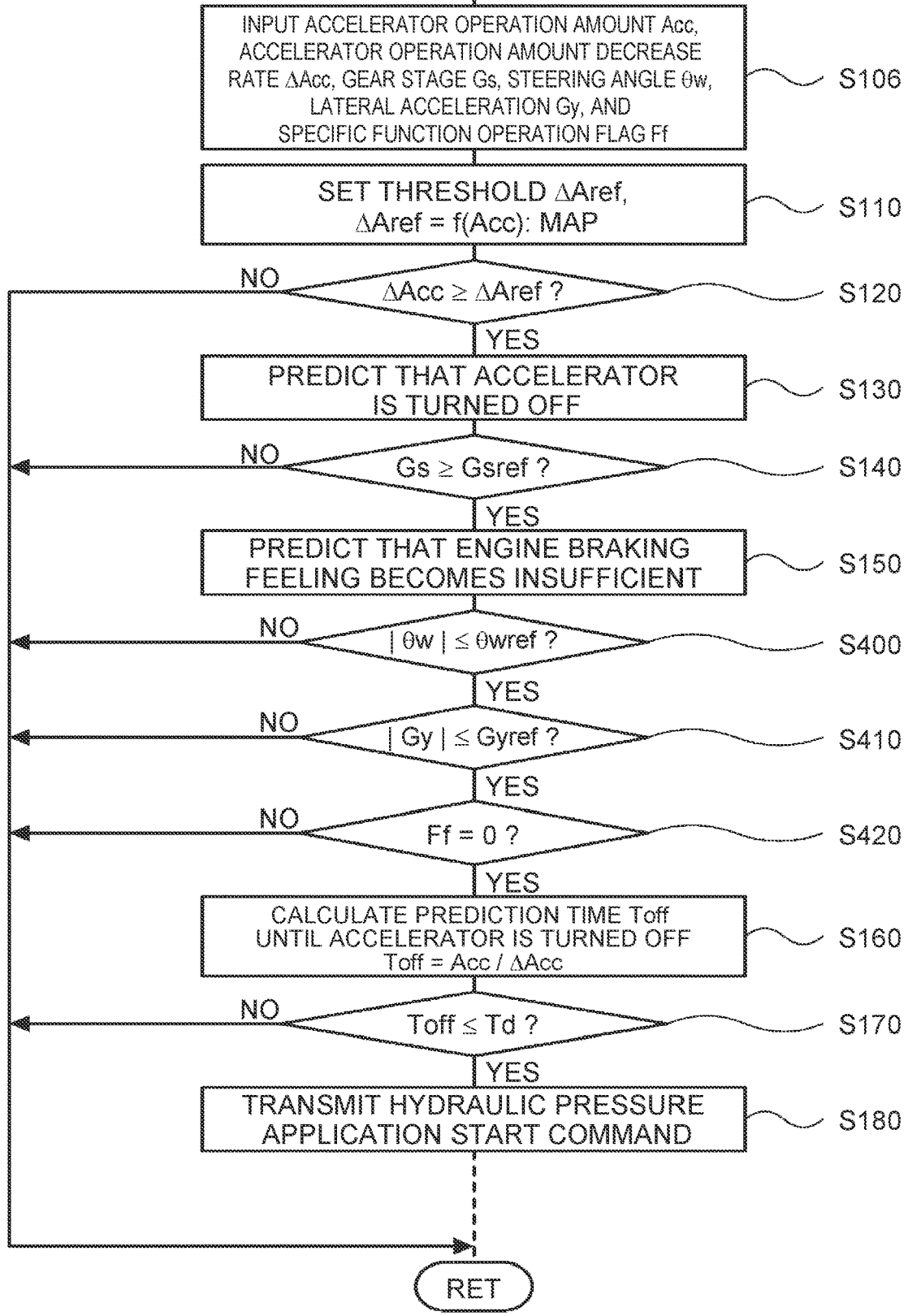
FIG. 10 is a flowchart showing an example of the process routine in a modification.

In the vehicle 20 of the embodiment, the main ECU 50 executes the process routine of FIG. 3. However, a process routine of FIG. 10 may be executed instead. The process routine of FIG. 10 is the same as that of the process routine of FIG. 3 except for the point that the process of step S100 is replaced with the process of step S106 and the point that the process of steps S400 to S420 is added. Therefore, illustration of the process of steps S190 to S260 in the process routine of FIG. 10 is omitted.

In the process routine of FIG. 10, the main ECU 50 first inputs the accelerator operation amount Acc, the accelerator operation amount decrease rate ΔAcc, and the gear stage Gs of the transmission 24 as in the process of step S100 in the process routine of FIG. 3, and additionally inputs the steering angle θw, the lateral acceleration Gy, a specific function operation flag Ff, and the like (step S106).

Here, the steering angle θw to be input is a value detected by the steering angle sensor 67. The lateral acceleration Gy to be input is a value detected by the acceleration sensor 69. The specific function operation flag Ff to be input is a value set by a specific function operation flag setting routine which is not illustrated. In the specific function operation flag setting routine, when a specific function that entrusts at least some driving operations to the vehicle (for example, cruise control, etc.) is in operation, the specific function operation flag Ff is set to a value one. When the specific function is not in operation, the specific function operation flag Ff is set to a value zero. In the vehicle 20 capable of operating the cruise control, cruise travel control and travel control for retaining inter-vehicle distance are executed. The cruise travel control is to control the engine 22 and the transmission 24 such that the vehicle speed V coincides with a target vehicle speed irrespective of the accelerator operation amount Acc when an unillustrated cruise control switch is ON. The travel control for retaining inter-vehicle distance is to control the engine 22 and the transmission 24 such that an inter-vehicle distance D from a preceding vehicle coincides with a target inter-vehicle distance. Which control to execute, the cruise travel control or the travel control for retaining inter-vehicle distance, is determined based on such factors as whether or not another vehicle is present within a prescribed distance ahead of the vehicle.

When predicting that the engine braking feeling will become insufficient in step S150, the main ECU 50 compares the absolute value of the steering angle θw with the threshold θwref (step S400), compares the absolute value of the lateral acceleration Gy with the threshold Gyref (step S410), and checks the value of the specific function operation flag Ff (step S420). Here, the threshold θwref is a threshold used for determining whether or not the absolute value of the steering angle θw is relatively large. The threshold Gyref is a threshold used for determining whether or not the absolute value of the lateral acceleration Gy is relatively large.

The main ECU 50 executes the process subsequent to step S160, when the absolute value of the steering angle θw is equal to the threshold θwref or less in step S400, when the absolute value of the lateral acceleration Gy is equal to the threshold Gyref or less in step S410, and when the specific function operation flag Ff is equal to the value zero in step S420. Therefore, when the prediction time Toff until the accelerator is turned off is equal to the dead time Td of the hydraulic pressure response of the hydraulic braking device 40 or less, application of the hydraulic pressure to the brake wheel cylinders 43a to 43d of the hydraulic braking device 40 is started.

The main ECU 50 ends the present routine without executing the process of steps S160 to S260, when the absolute value of the steering angle θw is larger than the threshold θwref in step S400, when the absolute value of the lateral acceleration Gy is larger than the threshold Gyref in step S410, and when the specific function operation flag Ff is equal to the value one in step S420. This makes it possible to restrain inconvenience caused by starting application of the hydraulic pressure to the brake wheel cylinders 43a to 43d of the hydraulic braking device 40 with the accelerator being in the turned-on state when the absolute value of the steering angle θw or the absolute value of the lateral acceleration Gy during turning or other operations is relatively large, or when the specific function, such as the cruise control, is in operation. When the cruise control is in operation, the accelerator is often in the turned-off state. Accordingly, it is assumed that the possibility that the routine is executed is low.

In the modification, when the engine braking feeling is predicted to become insufficient, whether to execute the process subsequent to step S160 is determined using the absolute value of the steering angle θw, the absolute value of the lateral acceleration Gy, and the value of the specific function operation flag Ff (presence or absence of operation of the specific function). However, whether to execute the process subsequent to step S160 may be determined using some of the absolute value of the steering angle θw, the absolute value of the lateral acceleration Gy, and the value of the specific function operation flag Ff.

In the modification, the process of steps S400 to S420 is added to the process routine of FIG. 3. However, the process of steps S400 to S420 may be added to the process routine of FIG. 7 or 9.

In the vehicle 20 of the embodiment, the six-gear stepped transmission is used as the transmission 24. However, four-gear, five-gear, seven-gear, and eight-gear stepped transmissions may be used as the transmission 24. A stepless transmission may also be used as the transmission 24.

Correspondence relation between the main elements of the embodiment and the main elements of the present disclosure described in Summary will be described. In the embodiment, the engine 22 corresponds to "engine", the hydraulic braking device 40 corresponds to "hydraulic braking device", and the brake ECU 48 and the main ECU 50 correspond to "control unit".

Since the correspondence relation between the main elements of the embodiment and the main elements of the present disclosure described in Summary is one example for specific description of the aspect for carrying out the present disclosure described in Summary, the correspondence relation is not intended to limit the elements of the disclosure described in Summary. More specifically, the disclosure disclosed in Summary should be interpreted based on the description therein, and the embodiment is merely a specific example of the disclosure disclosed in Summary.

Although the aspect for carrying out the present disclosure has been described using the embodiment, the present disclosure is not limited in any manner to the embodiment disclosed. It should naturally be understood that the present disclosure can be carried out in various aspects without departing from the scope of the present disclosure.

The present disclosure is applicable in the fields such as manufacturing of the vehicle.

What is claimed is:

1. A vehicle, comprising:
   an engine configured to output motive power to driving wheels;
   a hydraulic braking device configured to apply hydraulic braking force to wheels including the driving wheels; and
   a control unit configured to control the engine and the hydraulic braking device, wherein:
   the control unit starts application of hydraulic pressure in the hydraulic braking device when an accelerator is turned on, and the control unit predicts that the accelerator will be turned off, and the control unit predicts that engine braking feeling will become insufficient, the engine braking feeling being deceleration feeling given to a driver when the accelerator is turned off and an engine brake is operated, and a predetermined condition is established, the predetermined condition being that prediction time until the accelerator is turned off is shorter than dead time of a hydraulic pressure response of the hydraulic braking device; and the control unit causes the hydraulic braking device to generate a negative jerk in the vehicle, when the accelerator is turned off upon lapse of dead time after application of the hydraulic pressure in the hydraulic braking device is started.

2. The vehicle according to claim 1, wherein the dead time is time taken for filling a driving cylinder of a brake pad of the hydraulic braking device with hydraulic fluid.

3. The vehicle according to claim 1, wherein:
when the accelerator is turned on upon lapse of the dead time after application of the hydraulic pressure in the hydraulic braking device is started, the control unit causes the hydraulic braking device to generate the negative jerk in the vehicle; and
when the engine brake starts to operate, the control unit ends application of the hydraulic pressure in the hydraulic braking device.

4. The vehicle according to claim 1, wherein the control unit predicts that the accelerator will be turned off when a accelerator operation amount decrease rate that is a decrease amount per unit time of an accelerator operation amount becomes equal to a threshold or more, the threshold decreasing as the accelerator operation amount decreases.

5. The vehicle according to claim 1, wherein the control unit predicts that the engine braking feeling will become insufficient when at least one condition is established, out of a condition that a gear stage of a transmission provided between the engine and the driving wheels is equal to a prescribed gear stage or more, a condition that the vehicle travels on a downhill road, a condition that another vehicle is present within a first prescribed distance ahead of the vehicle, and a condition that a corner is present within a second prescribed distance ahead of the vehicle.

6. The vehicle according to claim 1, wherein even when predicting that the engine braking feeling will become insufficient, the control unit does not start application of the hydraulic pressure in the hydraulic braking device when at least one condition is established, out of a condition that an absolute value of a steering angle is larger than a prescribed steering angle, a condition that an absolute value of a lateral acceleration of the vehicle is larger than a prescribed acceleration, and a condition that a prescribed travel function is in operation.

7. The vehicle according to claim 1, wherein the control unit ends application of the hydraulic pressure in the hydraulic braking device when the accelerator is turned on upon lapse of the dead time after application of the hydraulic pressure in the hydraulic braking device is started.

* * * * *